United States Patent Office 2,966,421
Patented Dec. 27, 1960

2,966,421

CELLULAR LIGHTWEIGHT, ALUMINA CERAMIC

William F. Zimmerman and Robert S. Haeckl, Cincinnati, Ohio, assignors to General Electric Company, a corporation of New York No Drawing. Filed Dec. 24, 1957, Ser. No. 704,903

7 Claims. (Cl. 106—40)

Our invention relates to porous ceramic materials and a method of making lightweight refractory bodies. More particularly, our invention relates to the preparation of refractory bodies from a composition comprising alumina, a cell producing agent, phosphoric acid and a stabilizer, and to the curing of that composition.

Heretofore, some refractory bodies have been prepared from compositions containing a refractory material, such as alumina also known as "aluminum oxide" and a binder for such material. Some compositions have also included an organic "burn-out" material which, when heated at critical temperatures, decomposes to produce a pore-forming gas. The products formed from such compositions have been used for thermal insulating purposes, for example, as fire brick in furnaces. Other applications may be as cast liners for combustion chambers or as rubbing seals for rotating parts. However the product resulting from former methods is generally an open-pore, thermally conductive, heavy body that has poor insulating properties. Such bodies have a tendency to contract in use thereby causing fissures in the body and a general weakening of the structure. In addition they usually have low abrasion and erosion resistance and require a high curing temperature, considerably in excess of 600° F.

Therefore, it is an object of our invention to provide an improved method for making a cellular, lightweight, castable ceramic material which is inexpensive, has low thermal conductivity, low shrinkage, good strength and can be cured at a low temperature for use up to about 3000° F.

We find that we can produce a cellular ceramic body having a close-packed isolated-cell structure. The body is formed and cured at low temperatures and possesses exceptional physical properties. It has a low shrinkage value, a high compressive strength and low bulk density.

Briefly stated, in accordance with one aspect of our invention, we form our cellular ceramic body from a composition comprising alumina, a cell producing agent, water, phosphoric acid and a stabilizer. The range of the cell producing agent, water and stabilizer are critical as will be shown by the tables discussed later. Also, a ratio of alumina to phosphoric acid of about 3 to 1 is necessary to allow the alumina to become bonded with a phosphate bond of sufficient strength in our cellular structure.

The alumina we prefer to use is tabular alumina, a sintered or calcined pure aluminum oxide. It has thermal stability and strength at high temperatures and is used in this process in a finely divided state. Excellent results have been obtained from a —200 mesh tabular alumina grain. The alumina particles which are easily mixed with the other components to give strong cellular bodies, are used in the amount of about 3 parts by weight of alumina to one part by weight of an aqueous 85% phosphoric acid solution.

For forming a permanent bonding agent we prefer to use a solution of 85% phosphoric acid which forms an excellent phosphate bond between the alumina particles when heated to a temperature of about 600° F. Under these temperature conditions it is believed that the phosphoric acid, $H_3PO_4$, is dehydrated to form pyrophosphoric acid, $H_4P_2O_7$, which on continued heating to a temperature of about 600° F. reacts with alumina to form aluminum phosphate, $AlPO_4$. We have found that from about 61.8–63.4% by weight alumina mixed with about 22.8–23.4% by weight of phosphoric acid (85% aqueous solution) gives optimum results. The final cured product resulting from the use of these proportions thus has a calculated ratio of alumina to $P_2O_5$ of about 4.4 to 1.

To produce a cell-forming agent, we prefer to use finely divided aluminum which reacts with phosphoric acid to evolve hydrogen. However, other metals above hydrogen in the electrochemical series of elements may be used such as calcium, magnesium, zinc and barium. The amounts of this gas-generating metal may vary between 0.05–0.11% by weight to give optimum results. We prefer the particle size of our metal powder to vary between —325 and 400 mesh.

By regulating the amounts of the stabilizer used in our compositions, we have been able to obtain a superior cellular body. Satisfactory stabilizers which we have used include cornstarch, dried blood, egg albumen, carboxymethylcellulose and commercial foam stabilizer. The function of the stabilizer is to stabilize the foam by absorbing excess water and increasing the viscosity of the slurry to prevent slumping of the foam. The stabilizer also prevents the aluminum from settling out of the foam or from floating to the surface. The critical range of the stabilizer is from about 1–2% by weight and of the water is from about 12–15% by weight of the composition. Therefore, the broad composition range for our ceramic material including an alumina to phosphoric acid ratio of 3 to 1 is, in percent by weight, about 22.8–23.4 phosphoric acid (85%), about 61.8–63.4 alumina, about 0.05–0.1 gas generating metal, about 1–2 stabilizer and about 12–15 water.

In order that those skilled in the art may better understand how the present invention can be practiced, the following examples are given by way of illustration only and not by way of limitation. All parts and percents are by weight.

*Example 1*

Our specific preferred composition to produce our cellular ceramic body is the following:

| | Percent by weight |
|---|---|
| Alumina | 62.1 |
| Phosphoric acid (85%) | 23.1 |
| Water | 13.6 |
| Stabilizer | 1.18 |
| Aluminum (powder) | 0.08 |

We placed the water and acid in a container and slowly stirred in the alumina for about five minutes to assure dispersion and wetting of the alumina particles. We aged that mixture for about two hours to allow the heat of reaction between the acid and the alumina to dissipate so that the viscosity which varies with temperature, will be steady for subsequent operations. After this stabilizing step, we then stirred the mixture and added the aluminum powder. We stirred the batch for one minute to assure dispersion and segregation of the aluminum particles. We quickly added the stabilizer, which in this example was cornstarch, and stirred the mixture for about 20 seconds. Then we poured it into molds of a desired shape. We vibrated the molds gently to fill all voids. The evolution of hydrogen gas from the acid-aluminum reaction caused the batch to expand to approximately twice its original volume. The material was then allowed to air dry until it was solid enough to permit handling, which in this example was two days. This initial drying period is quite critical since the viscosity of the foam is controlled, by the absorbency of the added stabilizer, at a level high enough to prevent bubble collapse. We have found that any decrease in viscosity due to heating of the foam or the absorption of moisture from the air by the hygroscopic phosphoric acid slurry results in collapse of the foam. After preliminary air drying of the material, we placed it in a dryer and heated to 150° F. at a slow rate such that the removal of water and consequent increase in viscosity progresses at a rate greater than the decrease in viscosity caused by increasing temperature. After the 150° F. temperature has been reached without collapse of the foam, additional drying can be continued at a more rapid rate. The temperature in the drier was slowly brought up to about 300° F. where we held the material for a period of about 24 hours. In order to form a stable aluminum phosphate bond between alumina grains, we placed the material in a curing oven at about 600° F. and held it for about 5 hours where it hardened and became strong. At this stage the material is completely cured and will no longer absorb moisture from the air. The cured pieces were readily sawed, drilled or filed in much the same manner as any ordinary insulating firebrick. When tested, the bodies prepared in this manner within our range had a drying shrinkage of less than 1%, a compressive strength of about 750 pounds per square inch and a bulk density range of about 0.036-0.066 pound per cubic inch. The structure of the material comprised phosphate bonded alumina with incorporated fine gas bubbles or hollow cells each nearly spherical and completely separated from the adjacent cells by the solid phosphate bonded alumina matrix.

The composition appears in Table 1 below under Example 1 including 0.08% aluminum powder.

*Examples 2–5*

In the following Examples 2–5, we show four additional compositions using our preferred range of ingredients, in percent by weight, 61.8–63.4 alumina, 22.8–23.4 phosphoric acid (85%), 12–14.2 water, 0.05–0.11 metal powder and 1.17–1.26 organic stabilizer. Molded bodies were made from these compositions using the same process described in Example 1. The effects of varying the percentage range of aluminum for the compositions in Examples 2–5 as well as Example 1 above, are shown in Table 1 following Examples 2–5:

|  | Examples | | | |
|---|---|---|---|---|
|  | 2 | 3 | 4 | 5 |
| Alumina | 63.4 | 62.9 | 62.6 | 61.8 |
| Phosphoric Acid (85%) | 23.4 | 23.3 | 23.1 | 22.8 |
| Water | 12.0 | 12.6 | 13.1 | 14.2 |
| Stabilizer | 1.26 | 1.193 | 1.185 | 1.171 |

To determine the effect of aluminum on the final product, we varied the aluminum content in each of the composition given in Examples 1–5. The results of these tests, given in Table 1 below, show the critical relationship of the proportions of powdered aluminum as a cell-forming agent through production of hydrogen gas and aluminum's reaction with the phophoric acid solution. As used in Tables 1 and 2, U indicates an unsatisfactory product which was cracked, crazed and shrunken, F indicates a satisfactory product which was somewhat drawn and crazed, G indicates a good product which was lightly crazed and B indicates our best product.

TABLE 1

| Percent Aluminum Powder | Examples | | | | |
|---|---|---|---|---|---|
|  | 1 | 2 | 3 | 4 | 5 |
| 0.053 | U | U | G | G | U |
| 0.066 | G | G | F | G | G |
| 0.080 | B | G | G | F | F |
| 0.094 | F | U | U | U | F |
| 0.107 | F | U | G | G | G |

*Examples 6–10*

Using the method described under Example 1, we have also prepared other compositions in which we varied the stabilizer from about 0.825–0.806% by weight and the aluminum content from about 0.053–0.107% by weight in each composition:

|  | Examples | | | | |
|---|---|---|---|---|---|
|  | 6 | 7 | 8 | 9 | 10 |
| Alumina | 63.6 | 63.2 | 62.8 | 62.4 | 62.0 |
| Phosphoric Acid (85%) | 23.5 | 23.4 | 23.2 | 23.0 | 22.9 |
| Water | 12.1 | 12.6 | 13.1 | 13.7 | 14.3 |
| Stabilizer | 0.825 | 0.820 | 0.815 | 0.810 | 0.806 |

In order to determine the effect of aluminum on the final product produced from the composition of Examples 6–10 within our useful range of 3 parts alumina to 1 part of 85% phosphoric acid, we varied the aluminum content as in Examples 1–5. Table 2 below shows the relative value of products in a manner similar to that of Table 1:

TABLE 2

| Percent Aluminum Powder | Examples | | | | |
|---|---|---|---|---|---|
|  | 6 | 7 | 8 | 9 | 10 |
| 0.053 | U | U | U | U | U |
| 0.066 | U | U | F | G | G |
| 0.080 | G | F | U | U | G |
| 0.094 | U | U | U | U | F |
| 0.107 | U | U | G | G | U |

We have further discovered from testing compositions in our useful range of alumina and phosphoric acid in a ratio of about three parts by weight of alumina to about one part by weight of phosphoric acid, about 12–15% by weight of water and about 0.05–0.11% by weight of powdered aluminum, that the range of our stabilizer should not be above about 2% nor below about 1% by weight of the composition if a proper molded body is to be produced. The critical balance between the ingredients appears to be due in part to the stabilizer's function of absorbing excess water thereby stabilizing the foam by controlling the viscosity of the slurry after mixing and pouring.

Our cellular ceramic material shown in Examples 1–5 have the following physical properties:

(A) The following table shows the thermal conductivity of our cellular ceramic material having a bulk density of 0.043 pounds per cubic inch:

| Temperature (° F.) | Thermal Conductivity, B.t.u./(sq. ft.) (hr.)—Degree F./in. |
|---|---|
| 400 | 6.6 |
| 1,000 | 6.6 |
| 1,600 | 7.0 |
| 2,200 | 8.1 |
| 2,600 | 9.5 |
| 3,000 | 12.0 |

(B) The strength of our cellular ceramic material is shown by its modulus of rupture given in the following table:

| Temperature (° F.) | Avg. Modulus of Rupture (p.s.i.) |
| --- | --- |
| 75 | 385 |
| 1,500 | 742 |
| 2,000 | 716 |
| 2,400 | 666 |

(C) Drying shrinkage is less than 1%.
(D) Firing shrinkage is negligible to 3000° F.
(E) Compressive strength is about 750 p.s.i.
(F) Bulk density is about 0.036–0.066 pound per cubic inch.

The cellular ceramic material formed by the method of our invention is useful as thermal insulating refractory materials for articles such as combustion chambers, and as firebrick in furnace structures. Our material may be formed in place over a suitable reinforcing structure prior to curing since it requires no high temperature sintering treatment to develop bond strength. When used as an insulating material in the walls of a combustion system, our product has the advantages of being securely fastened to the structure wall as a single layer of material.

In the foregoing description we have discussed our process for making a cellular, high temperature, lightweight alumina ceramic material and the material thus produced. Although we have described our invention in connection with specific examples, those skilled in the art of ceramics and thermal insulation will readily understand the modifications and variations of which our invention is capable, for example, as to methods equivalent to drying, variation of time and temperature necessary for the initial air drying and subsequent forced drying and curing of our material, as to the variation and size of metal powders used to react with the phosphoric acid to give a foam producing gas, as to the type of stabilizers employed and as to equivalent methods of casting a product. We intend in the appended claims to cover modifications and variations that come within the true spirit and scope of our invention.

What we claim as new and desire to secure by Letters Patent of the United States is:

1. In a method for producing a lightweight cellular material, the steps of: (1) mixing together in percent by weight about 22.8–23.4 phosphoric acid (85%), about 61.8–63.4 alumina and about 12–15 water; (2) aging the mixture to allow heat of reaction to dissipate and viscosity to stabilize; (3) dispersing in the mixture about 0.05–0.1 percent by weight of a finely divided metal powder which reacts with the reaction mixture to produce a gas whereby a cellular material is produced from the mixture; (4) adding about 1–2 percent by weight of a water absorbing foam stabilizer to absorb any excess water and to increase the viscosity of the cellular mixture; (5) air drying the cellular material at room temperature until the said material retains its shape without collapse of its structure, (6) heating from room temperature to about 150° F. at a rate which increases viscosity thus to prevent collapse of the cellular structure, (7) slowly raising the temperature of the material from about 150° F. to about 300° F., (8) heating the material at about 300° F., (9) and then heating at about 600° F. to provide a cellular material having a density of 0.036–0.066 lb. per cubic inch and compressive strength of about 750 lbs. per square inch.

2. The method of claim 1 in which the finely divided metal powder which will react with phosphoric acid to produce the gas is aluminum powder.

3. The method of claim 1 wherein the ingredients comprise in percent by weight: 62.1 alumina; 23.1 phosphoric acid (85%); 13.6 water; 0.08 finely divided aluminum powder; and 1.18 organic stabilizer.

4. The method of claim 1 in which, in percent by weight, the foam stabilizer is about 1.1–1.3.

5. The method of claim 4 in which the finely divided metal powder is aluminum powder.

6. In a method for producing a lightweight cellular material, the steps of (1) mixing together in percent by weight about 22.8–23.4 phosphoric acid (85%), about 61.8–63.4 alumina and about 12.0–14.2 water; (2) aging the mixture for about 2 hours to allow heat of reaction to dissipate and viscosity to stabilize; (3) dispersing in the mixture about 0.05–0.11 percent by weight of a finely divided metal powder which reacts with the reaction mixture to produce a gas whereby a cellular material is produced from the mixture; (4) adding about 1.17–1.26 percent by weight of an organic water absorbing foam stabilizer to absorb any excess water and to increase the viscosity of the cellular mixture; (5) casting the mixture into a desired structural shape; (6) air drying the cellular material at room temperature until the said material will retain its shape without collapse of its structure, (7) heating from room temperature to about 150° F. at a rate which increases viscosity whereby collapse of the cellular structure is prevented, (8) slowly heating the material from about 150° F. to about 300° F., (9) heating the material at about 300° F. for about two days, (10) and then heating at about 600° F. for up to about five hours to provide a cellular material having a density of 0.036–0.066 lb. per cubic inch and a compressive strength of about 750 lbs. per square inch.

7. A cellular material cured at a temperature of about 600° F. consisting essentially of alumina joined together through an aluminum phosphate bond, and having a ratio of alumina to $P_2O_5$ of about 4.4 to 1, said cellular material having a density of 0.036–0.066 pound per cubic inch, and a compressive strength of about 750 pounds per square inch.

References Cited in the file of this patent

UNITED STATES PATENTS

| | | |
| --- | --- | --- |
| 2,873,014 | Morgan | Aug. 23, 1932 |
| 2,405,884 | Greger | Aug. 13, 1946 |
| 2,455,758 | Greger | Dec. 7, 1948 |
| 2,588,646 | Miller et al. | Mar. 11, 1952 |
| 2,630,616 | Robinson | Mar. 10, 1953 |

FOREIGN PATENTS

| | | |
| --- | --- | --- |
| 661,607 | Great Britain | Nov. 21, 1951 |